US008285692B2

(12) United States Patent  
Johnson et al.

(10) Patent No.: US 8,285,692 B2
(45) Date of Patent: Oct. 9, 2012

(54) METHOD AND SYSTEM FOR ATTRIBUTE ENCAPSULATED DATA RESOLUTION AND TRANSCODING

(75) Inventors: Darrin P. Johnson, San Jose, CA (US); William H. Moore, Fremont, CA (US); Eric C. Saxe, Livermore, CA (US)

(73) Assignee: Oracle America, Inc., Redwood City, CA (US)

(*) Notice: Subject to any disclaimer, the term of this patent is extended or adjusted under 35 U.S.C. 154(b) by 248 days.

(21) Appl. No.: 12/688,458

(22) Filed: Jan. 15, 2010

(65) Prior Publication Data

US 2011/0178997 A1 Jul. 21, 2011

(51) Int. Cl.
*G06F 17/00* (2006.01)
*G06F 7/00* (2006.01)

(52) U.S. Cl. ........................ 707/694; 707/770
(58) Field of Classification Search .................. 707/102, 707/792, 608, 10, 999, 200, 1, 770, 100
See application file for complete search history.

(56) References Cited

U.S. PATENT DOCUMENTS

| | | | |
|---|---|---|---|
| 6,330,572 B1 * | 12/2001 | Sitka ............................ 707/608 |
| 6,345,279 B1 * | 2/2002 | Li et al. ................................. 1/1 |
| 7,243,094 B2 * | 7/2007 | Tabellion et al. ..................... 1/1 |
| 7,272,613 B2 * | 9/2007 | Sim et al. ................. 707/999.01 |
| 7,349,923 B2 * | 3/2008 | Spring et al. .................. 707/792 |
| 7,496,565 B2 * | 2/2009 | Thind et al. ........................... 1/1 |
| 7,593,966 B2 * | 9/2009 | Therrien et al. ...................... 1/1 |
| 7,769,723 B2 * | 8/2010 | Zheng et al. .................... 707/682 |
| 7,873,619 B1 * | 1/2011 | Faibish et al. ................. 707/705 |
| 2005/0108296 A1 * | 5/2005 | Nakamura et al. ............. 707/200 |
| 2006/0026162 A1 * | 2/2006 | Salmonsen et al. .............. 707/10 |
| 2007/0083482 A1 * | 4/2007 | Rathi et al. ......................... 707/1 |
| 2007/0112826 A1 * | 5/2007 | Laksono ....................... 707/102 |
| 2007/0266037 A1 * | 11/2007 | Terry et al. .................... 707/100 |
| 2007/0282868 A1 * | 12/2007 | Wanigasekara-Mohotti et al. ............................ 707/100 |
| 2008/0016121 A1 * | 1/2008 | Revah et al. .................. 707/200 |
| 2008/0298469 A1 * | 12/2008 | Liu et al. .................. 375/240.26 |
| 2009/0300084 A1 * | 12/2009 | Whitehouse .................. 707/205 |
| 2010/0042655 A1 * | 2/2010 | Tse et al. ....................... 707/200 |
| 2010/0076994 A1 * | 3/2010 | Soroca et al. ................. 707/769 |
| 2010/0082672 A1 * | 4/2010 | Kottomtharayil et al. ..... 707/770 |
| 2011/0022642 A1 * | 1/2011 | deMilo et al. ................. 707/805 |
| 2011/0196822 A1 * | 8/2011 | Zunger et al. ................. 707/609 |

* cited by examiner

*Primary Examiner* — James Trujillo
*Assistant Examiner* — Thong Vu
(74) *Attorney, Agent, or Firm* — Osha Liang LLP (57) ABSTRACT

A computer readable medium having software instructions that, when executed, perform a method for preserving data stored in a file system with a plurality of files. The method involves determining whether storage capacity of the file system has reached a threshold level, wherein the threshold level is stored in at least one of a plurality of size-reducing policies, obtaining a criterion from the at least one size-reducing policy, identifying a subset of the plurality of files that match the criterion, accessing metadata of each of the identified subset of files, wherein the metadata of each of the identified subset of files comprises at least one option for reducing a size of the file, and performing a size-reducing action to reduce a size of each of the identified subset of files based on the option for reducing the size of each of the identified subset of files and the criterion.

13 Claims, 4 Drawing Sheets

METHOD AND SYSTEM FOR ATTRIBUTE ENCAPSULATED DATA RESOLUTION AND TRANSCODING

BACKGROUND

Demand nearly always outweighs supply when it comes to storage, especially for data intensive multimedia and data center environments. For example, the storage capacity provided by a conventional digital video recorder (DVR) for television programs, audio programs, and gaming applications, etc., typically have limited storage and the maximum storage capacity can often be reached sooner than a consumer would prefer. There are numerous strategies used to address finite storage capacity including deletion, archiving, compression, etc., each of which have their shortcomings. For example, feasibility, latency, and loss are all concerns with the above-mentioned strategies for increasing storage capacity.

SUMMARY

In general, in one aspect, the invention relates to a computer readable medium comprising software instructions that, when executed, perform a method for preserving data stored in a file system comprising a plurality of files, comprising determining whether storage capacity of the file system has reached a threshold level, wherein the threshold level is stored in at least one of a plurality of size-reducing policies, obtaining at least one criterion from the at least one size-reducing policy, identifying a subset of the plurality of files that match the at least one criterion, accessing metadata of each of the identified subset of files, wherein the metadata of each of the identified subset of files comprises at least one option for reducing a size of the file, and performing a size-reducing action to reduce a size of each of the identified subset of files based on the at least one option for reducing the size of each of the identified subset of files and the at least one criterion.

In general, in one aspect, the invention relates to a system, comprising a file system comprising a plurality of files, a storage pool configured to store the plurality of files, and a service configured to determine whether storage capacity of the file system has reached a threshold level, wherein the threshold level is stored in at least one of a plurality of size-reducing policies, obtain at least one criterion from the at least one size-reducing policy, identify a subset of the plurality of files that match the at least one criterion, access metadata of each of the identified subset of files, wherein the metadata of each of the identified subset of files comprises at least one option for reducing a size of the file, and perform a size-reducing action to reduce a size of each of the identified subset of files based on the at least one option for reducing the size of each of the identified subset of files and the at least one criterion.

Other aspects of the invention will be apparent from the following description and the appended claims.

DETAILED DESCRIPTION

Specific embodiments of the invention will now be described in detail with reference to the accompanying figures (also referred to as "Fig."). Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for addressing limited storage capacity by preserving stored multi-media data for extended periods of time. More specifically, embodiments of the invention preserve data by using file system accessible attributes which encapsulate data resolution and transcoding options for automatic adjusting of density of stored data to address capacity challenges.

Figure 1:
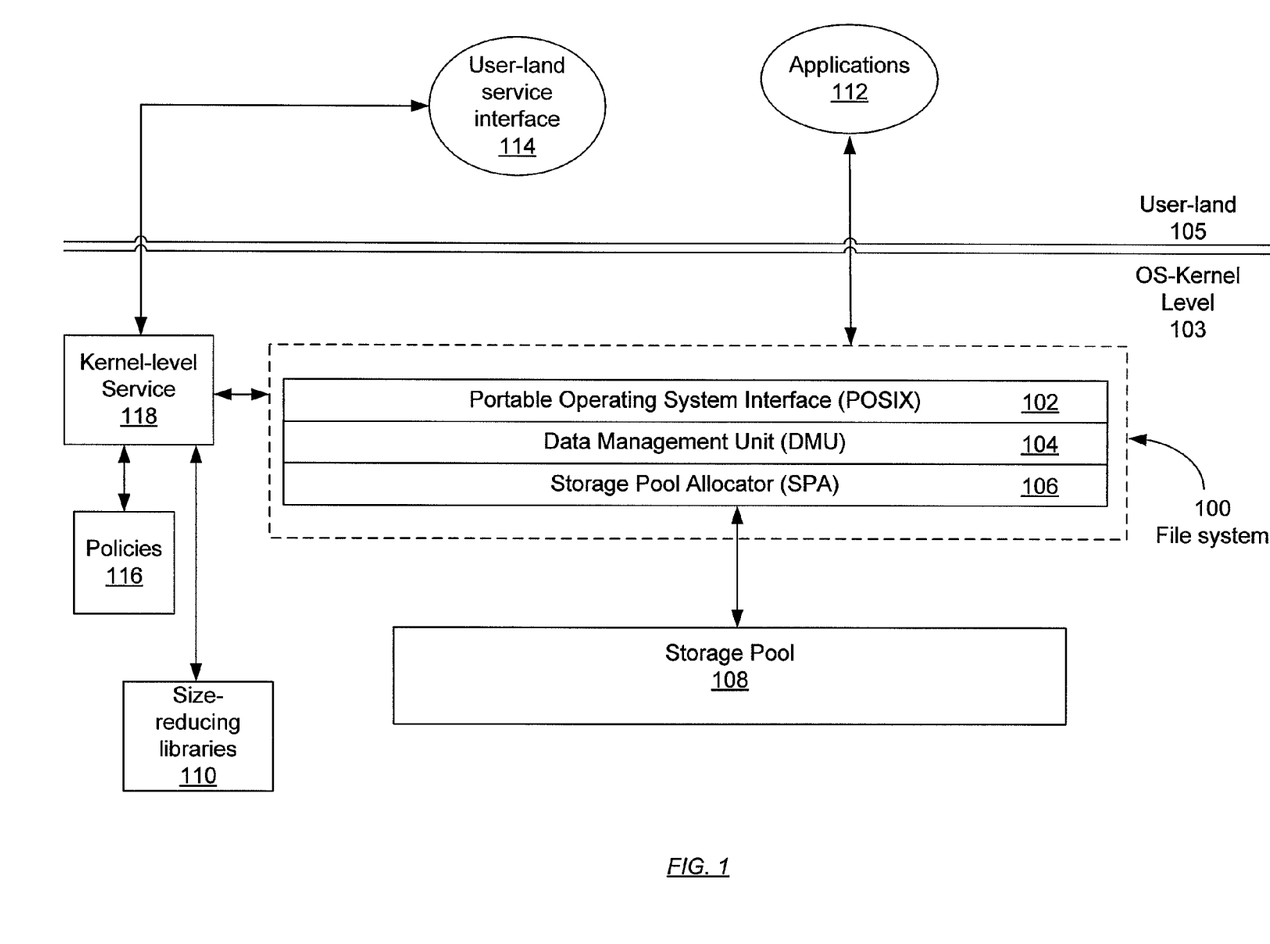
FIG. 1 shows a system architecture with file system attributes that encapsulate data resolution and transcoding options in accordance with one or more embodiments of the invention.

FIG. 1 shows a system architecture in accordance with one embodiment of the invention. The system architecture depicts elements in user-land (105) and in an operating system (OS)-kernel level (103). The OS-kernel level (103) includes a file system (100), a kernel-level service (118), policies (116), and size-reducing libraries (110). In one or more embodiments disclosed herein, the file system (100) is also a logical volume manager. For example, the file system (100) may be a ZFS file system. The user-land (105) includes a service interface (114) and applications (112). Each of the aforementioned components shown in FIG. 1 is described below.

The OS-kernel level (103) interfaces with a file system (100), which in turn interfaces with a storage pool (108). Specifically, the OS-kernel level (103) interfaces with the file system (100) via the POSIX interface (102). The POSIX interface (102) is the primary interface for interacting with the file system (100) and represents a standard that defines services that the file system (100) provides. Specifically, the POSIX interface (102) presents a file system abstraction of files and directories. The POSIX interface takes instruction from the OS-kernel level (103) on I/O requests. In addition, the POSIX interface (102) is responsible for bridging the gap between the virtual file system interfaces and the underlying data management unit (DMU) interfaces. In the file system (100) of FIG. 1, the POSIX interface (102) sits atop the DMU (104) and enables DMU objects (discussed below) to be POSIX-compliant.

The OS-kernel level (103) provides operations for users to access files within the file system (100). These operations may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations provided by the OS-kernel level (103) correspond to operations on objects.

More specifically, in one embodiment of the invention, a request to perform a particular operation (i.e., a transaction) is forwarded from the OS-kernel level (103), via the POSIX interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks which store the file data and indirect blocks which store metadata corresponding to referenced data blocks or other referenced indirect blocks. The file system (100) maintains the data and indirect blocks in a hierarchical block tree structure. Every block in the file system is accessible via a single root block. The hierarchical block tree (HBT) structure and the specific implementation of data blocks and indirect blocks is discussed in related U.S. Pat. No. 7,603,568, which is incorporated by reference herein in its entirety.

In one embodiment of the invention, copy-on-write transactions are performed for every data write request to a file. That is, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU (104) writes out the corresponding block pointers (within indirect blocks) to unused segments in the storage pool. In one embodiment of the invention, metadata fields for the corresponding block pointers are populated by the DMU (104) prior to sending an I/O request to the storage pool allocator (SPA) (106). The indirect blocks including the block pointers are typically written one level at a time. To complete the copy-on-write transaction, the SPA (106) issues a single write that atomically changes the root block to reference the indirect blocks referencing the modified data block. Thus, the file system (100) does not overwrite live data.

Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The SPA (106) also provides an interface to the storage pool and manages allocation of storage space within the storage pool (108).

In one embodiment of the invention, the storage pool (108) includes one or more physical disks (not shown) for storing data blocks and indirect blocks. The storage pool (108) may store multimedia content, such as photos, video, audio, etc, or any other suitable multimedia data type. Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

In the system architecture of FIG. 1, size-reducing options (e.g., downsampling and/or transcoding options) are stored as file system attributes which are managed and interpreted by the file system (100). File system attributes give the operating system and applications (112) more information about the file and how the file is intended to be used. File system attributes may store, along with the size-reducing options, permissions for the file, the owner of the file, a timestamp indicating the creation or last access of the file, and other metadata associated with the file. Thus, in one or more embodiments of the invention, size-reducing options for each file are added to the other metadata already encapsulated by file system attributes.

In one or more embodiments of the invention, the file system (100) interfaces with a kernel-level service (118) that is configured to access and interpret file system attributes. In one or more embodiments of the invention, the kernel-level service (118) may also be configured to monitor file system events, such as file modifications, creations and deletions of files, etc. Any file system component (e.g., the SPA, the DMU, etc.) may subscribe to the kernel-level service (118). In one or more embodiments of the invention, the kernel-level service (118) uses scalable hash algorithms to create arbitrary (name, object) associations within a DMU object set. The "name, object" associations may be used to implement attributes of the file, including size-reducing options for the file. Those skilled in the art will appreciate that while the kernel-level service (118) is shown as operatively connected to the file system (100), the kernel-level service (118) may be located within the file system (100). For example, in the case where the file system is the ZFS file system, the kernel-level service (118) may be a ZFS attribute processor (ZAP) that may be located within the DMU (104).

The kernel-level service (118) is operatively connected to a repository that stores polices (116). Policies (116) stored in the OS-kernel level (103) represent the threshold inquiries that need to be met before size-reduction actions are performed. Said another way, policies (116) may be periodically checked by the kernel-level service (118) to determine when size-reduction actions should be taken by the file system. In one or more embodiments of the invention, a size-reduction policy may include at least one threshold level and one or more criteria.

More specifically, a size-reducing policy threshold may specify, for example, a threshold level of storage capacity of the storage pool (or a portion thereof). Upon reaching the threshold level, size-reducing measures for stored data may be implemented by the file system. More specifically, a size-reducing policy threshold may specify that size-reduction measures may be taken when the storage pool 75% full. Alternatively, in one or more embodiments of the invention, a size-reducing policy threshold may be based on other characteristics of the file system, such as data integrity or data redundancy. For example, there may be a threshold level after which data integrity of the stored files in the storage pool may be compromised.

In one or more embodiments of the invention, the size-reducing policy threshold may also specify one or more criteria that need to be met before performing size-reducing activities on stored files. More specifically, the size-reducing policy threshold may specify criteria such as an age of stored files (where the age is based on the time of creation or the time since the last access of the file), a minimum size of stored files, a file type, available storage capacity in the storage pool, files accessed by a particular user, or any other suitable criteria related to stored files.

In one or more embodiments of the invention, the size-reducing policy threshold and/or the one or more criteria may be user-defined and/or system-defined. That is, a file system user may specify a particular storage pool capacity threshold, after which size-reducing efforts are made. Alternatively, the file system (100) may dynamically determine, based for example on data collected from previously monitored file system events, a size-reducing policy threshold. Similarly, criteria for obtaining files on which to perform size-reducing actions may be specified by a user or may be determined by the file system (100). Further, the size-reducing policy threshold may initially be set at a particular storage capacity or data integrity threshold level, and may be modified at a later time to reduce or increase the threshold level.

Continuing with FIG. 1, the kernel-level service (118) is configured to access the policies (116) to determine when a size-reducing policy threshold is met and to subsequently access file system attributes and size-reducing libraries (110). Size reducing libraries (100) may include down-sampling libraries, transcoding libraries (e.g., Codec), a combination thereof, and/or any other type of suitable size-reducing library. Specifically, size-reducing libraries (110) may include algorithmic functions (e.g., MPEG, AC3, etc.) and other relevant data needed to perform downsampling and transcoding of files. In one or more embodiments of the invention, the kernel-level service (118) may perform appropriate size-reducing activities on files that meet one or more criteria stored in the size-reducing policies. Alternatively, the kernel-level service (118) may provide the necessary data from the policies (116) and the size-reducing libraries (110) to the file system (100), and the file system (100) may handle file transcoding and downsampling internally.

Those skilled in the art will appreciate that each of the kernel-level service (118), policies (116), and the size-reducing libraries (110) may be accessed via the POSIX interface (102) of the file system (100). Alternatively, in one or more embodiments of the invention, the file system (100) may be extended to provide additional interfaces (not shown) that provide direct access to size-reducing libraries. For example, interfaces positioned higher than the POSIX interface (102) (e.g., audio and/or video specific interfaces) or lower than the POSIX interface (102) (e.g., when POSIX semantics are not necessary) may be used to access the kernel-level service (118) and size-reducing libraries (110).

The components in user-land (105) include applications (112) which may execute on the local system (i.e., computer) or may be located on a remote system, uses files as an abstraction to address data. A request to access a file is typically performed by one or more applications (112), via the file system (100), using a file name and logical offset. In addition, a user-land service interface (114) executes in user-land and is operatively connected to the kernel-level service (118). In one or more embodiments of the invention, the user-land service interface (114) exposes an interface to users/clients for setting size-reducing policies and specifying criteria based upon which files are identified for size-reduction. An external client or service-provider may subscribe to the kernel-level service (118) via the user-land service interface (114).

Figure 2:
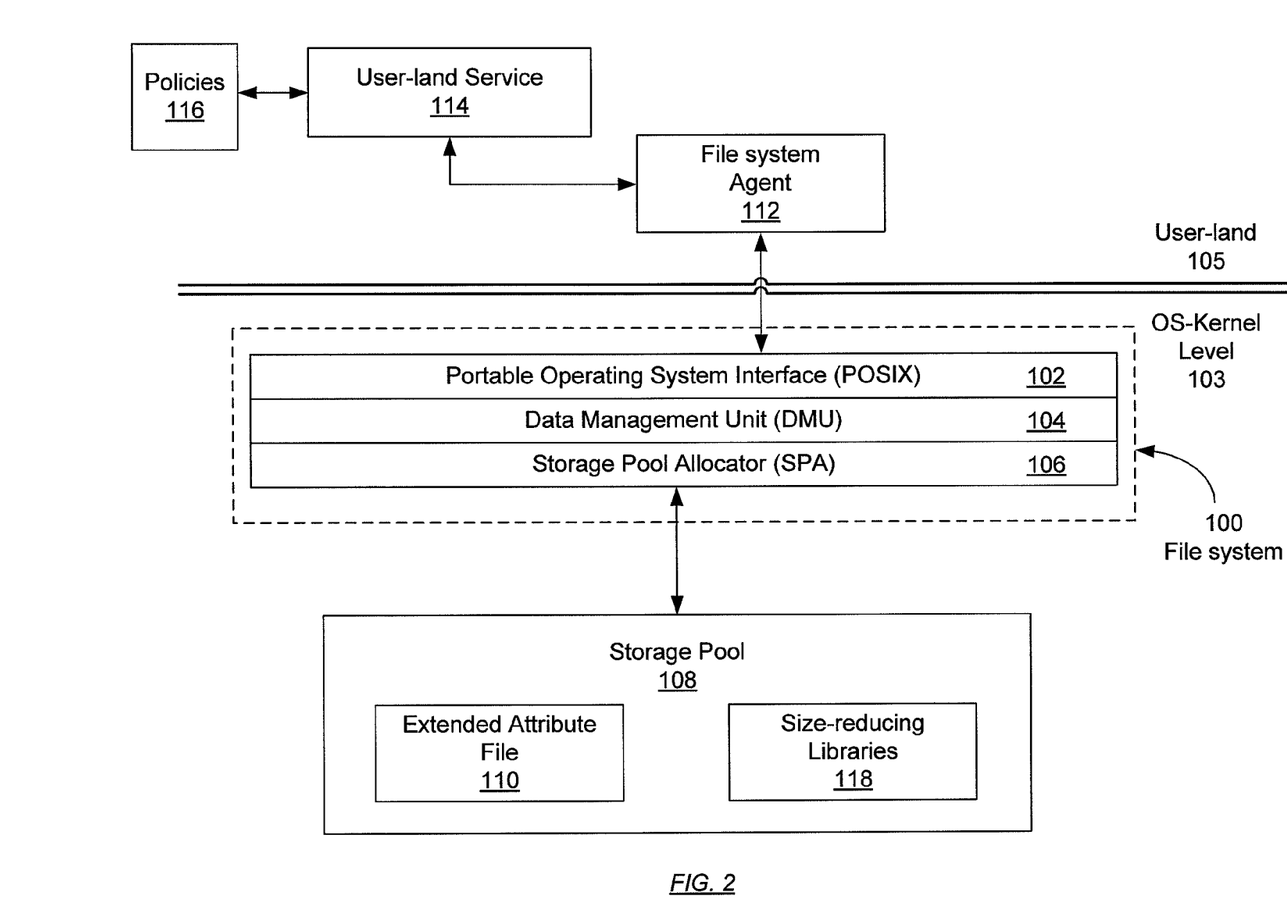
FIG. 2 shows a system architecture with access to extended attributes that encapsulate data resolution and transcoding options in accordance with one or more embodiments of the invention.

FIG. 2 shows a system architecture in which size-reducing options for individual files are stored as extended attributes of the file. Extended attributes is a file system feature that enables users to associate data files with metadata not interpreted by the file system, whereas regular attributes have a purpose strictly defined by the file system (such as permissions or records of creation and modification times). Each extended attribute is denoted by a name and the associated data. In one or more embodiments of the invention, the extended attributes are stored in an extended attribute file (110) located in the storage pool (108). Alternatively, the extended attribute file (110) may be located on a remote system accessible by the user-land service (114).

Those skilled in the art will appreciate that the description of the file system (100), file system components (102, 104, 106), and the storage pool (108) discussed above with respect to FIG. 1 also apply to the same components shown in FIG. 2.

When size-reducing options are stored as extended attributes, the file system itself is not able to access or interpret the attributes stored in the extended attribute file (110). Thus, the file system is operatively connected to external services (e.g., file system agent (112), user-land service (114)) that are configured to monitor file system events and determine when size-reducing measures may be taken. Therefore, in the system architecture of FIG. 2, a file system agent (112) situated in user-land (105) is configured to listen to file system events and report monitored events to the user-land service (114). The file system agent (112) may be a daemon configured to periodically poll the file system and/or listen for file system events.

The file system agent (112) is operatively connected to the user-land service (114). The user-land service (114) in FIG. 2 is an external service which is configured to access the policies (116) to determine when a policy threshold is met, identify the files that match one or more criteria specified in the checked policies (116), and access the size-reducing libraries (118) stored in the storage pool (108) to perform size-reducing actions associated with identified files. Thus, the user-land service (114) may be configured to perform size-reducing activities on identified files in the system of FIG. 2. In one or more embodiments of the invention, the user-land service (114) accesses the extended attribute file (110) and the size-reducing libraries (118) via the file system agent (112) and the POSIX interface (102) of the file system. Alternatively, although not shown in FIG. 2, the user-land service (114) may have direct access to the data stored in the storage pool (108). Similar to FIG. 1, users/clients of the file system (100) may also user the user-land service (114) to set policies and criteria.

Those skilled in the art will appreciate that while FIGS. 1 and 2 illustrate much of the same system architecture, the difference is where the call to perform size-reducing activities originates. In the system of FIG. 1, the file system (100) manages the file system attributes and performs size-reducing activities dynamically; thus, the call to perform downsampling and/or transcoding originates from the file system. In the system of FIG. 2, the file system is operatively connected to external services that listen to system events and determine when size-reducing activities may be implemented. Thus, the call to perform downsampling and/or transcoding originates outside the file system in the system of FIG. 2.

Figure 3:
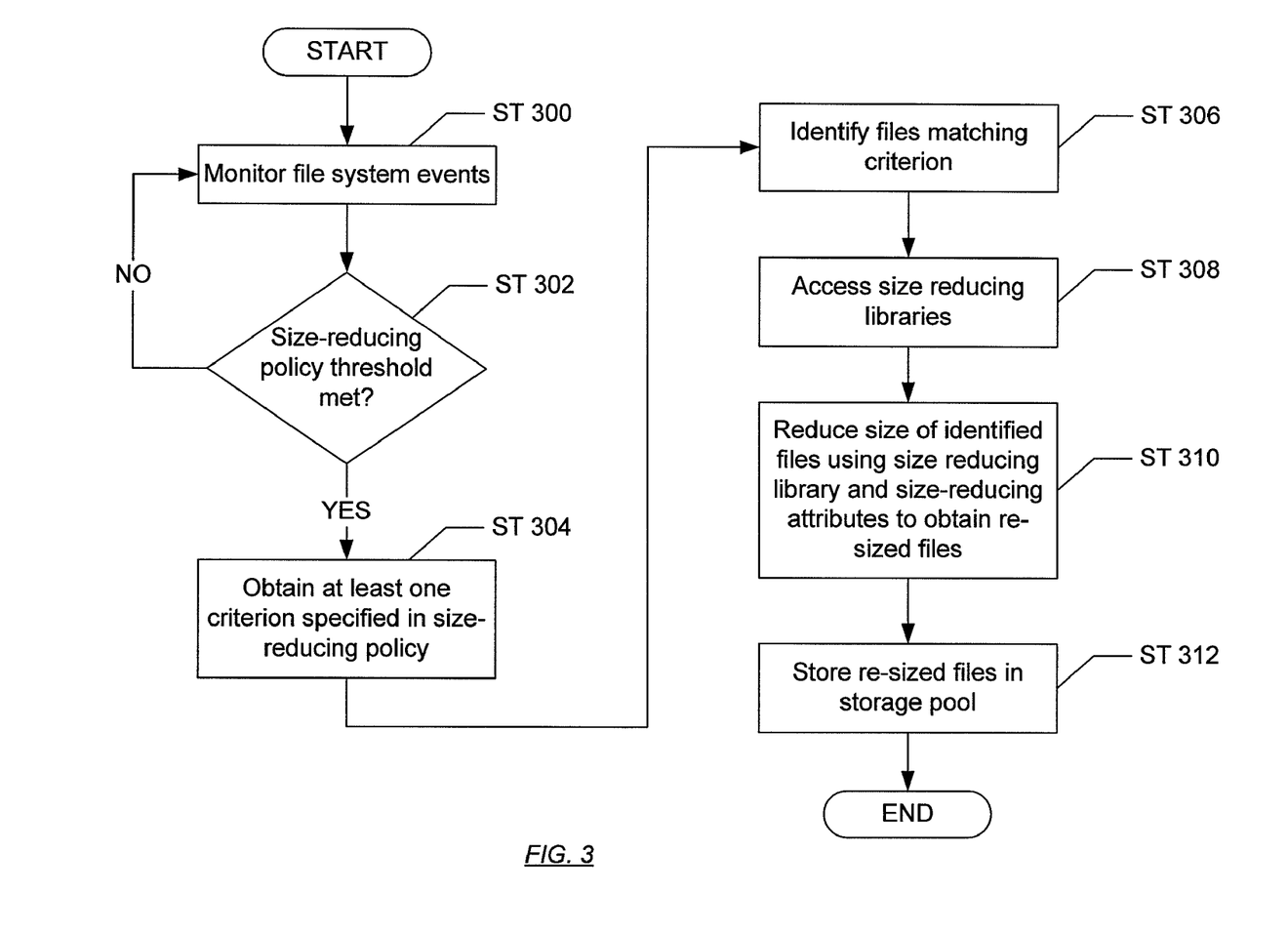
FIG. 3 shows a flow chart for data resolution and transcoding using a file system in accordance with one or more embodiments of the invention.

FIG. 3 shows a flow chart describing a mechanism for automatic data resolution and transcoding management of files. While the various steps in the flow chart of FIG. 3 are presented and described sequentially, one of ordinary skill will appreciate that some or all of the steps may be executed in different orders, may be combined or omitted, and some or all of the steps may be executed in parallel. Those skilled in the art will appreciate that before the process of FIG. 3 begins, options for size-reducing individual files may be stored as file system attributes or as extended attributes. Further, those skilled in the art will appreciate that attributes (stored as either file system attributes or extended attributes) may be user-defined or may be based on an original file type.

Initially, file system events are monitored (ST 300). Specifically, in one or more embodiments of the invention, file system events such as data writes, data reads, deletions of data, creation of a new file, modifications to file names or to the storage pool hierarchy, or any other event that may affect the storage capacity of the storage pool may be monitored by a file system agent or by the file system itself. When size-reducing options are stored as extended attributes, a file system agent in user-land may perform file system event monitoring. Alternatively, when size-reducing options are stored as file system attributes, the file system itself may perform monitoring of events. In one or more embodiments of the invention, file system events are monitored to determine whether one or more size-reducing policy thresholds are met (ST 302). As described above, a size-reducing policy threshold may be triggered when the storage pool is a particular percent full (e.g., 75% full), and/or when data integrity is compromised in some way. Those skilled in the art will appreciate that more than one size-reduction policy threshold may be checked to determine whether any one policy threshold is met.

Continuing with FIG. 3, if the size-reducing policy threshold is not met, then the process continues to monitor file system events (ST 300). When the size-reducing policy threshold is met (ST 302), at least one criterion from the size-reducing policy is obtained (ST 304). Size-reducing criteria may include a minimum age of stored files, a minimum size of stored files, a file type (e.g., all JPEG files, all multimedia files, etc.), any combination thereof, or any other criterion or combination of criteria that may be used to identify files on which to perform size-reduction activities. For example, the size-reducing policy threshold may specify that size reducing efforts may be taken when the storage pool is 75% full, and may also specify that files older than 3 months from a current date should be examined for size-reduction. Those skilled in the art will appreciate that criteria may not be part of the size-reducing policy. Instead, one or more criteria (e.g., a minimum file size) may be pre-defined by the system architecture as a default criteria or determined on-the-fly by the file system when a size-reducing policy threshold is met.

Subsequently, files stored in the storage pool that match at least one criterion obtained from the size-reducing policy are identified (ST 306). The files that match the criterion identified from the size-reducing policy may be a subset (i.e., less than all) of the files stored in the storage pool. For example, if the criterion obtained from the size reduction policy specifies that files with an age that is older than three months are to be reduced in size, then all the files stored in the storage pool that are older than three months from a current date are identified. Alternatively, if the criterion obtained from the size-reducing policy specifies a minimum file size that must be met for size-reduction activities, then all the stored files larger than the minimum file size are identified. Those skilled in the art will appreciate that if there is no criteria specified in the size-reducing policies, then all files stored in the storage pool may be examined for size-reducing possibilities.

Next, size reducing libraries are accessed by the file system (ST 308). Size-reducing libraries may be accessed using a kernel-level service that directly interfaces with size-reducing libraries, or using an external agent, such as a service in user-land that can provide access to such libraries. Size-reducing libraries may include transcoding libraries and downsampling libraries (e.g., Codec) that provide algorithmic functions for reducing the size of stored files. The type of size-reducing libraries accessed may depend on the size-reducing options stored in the attributes associated with the identified files. Thus, although not shown in FIG. 3, prior to ST 308, the file system or a user-land service may access the attributes that store the size-reducing options for the identified files to determine which size-reducing libraries are necessary to perform the specified size-reducing options for the identified files.

At this stage, the size of the files identified using the criterion is reduced using the functions provided in the size-reducing libraries (ST 310). Specifically, in one or more embodiments, the size of the identified files is reduced according to the downsampling or transcoding options stored in corresponding file attributes, which may be stored as file system attributes or extended attributes. When the size-reducing options are stored as extended attributes, an external agent may access the extended attributes file for each identified file to obtain the size-reducing options stored for the identified files. Subsequently, an external service may perform the size-reducing (e.g., downsampling and/or transcoding) of the identified files.

Alternatively, when the size-reducing options are stored as file system attributes, the file system accesses the file system attributes of each identified file to determine which type of size-reducing activity to perform on the identifies files. The file system may then use a callout function, such as Doors, to call a kernel-level service that performs downsampling and/or transcoding of identified files. In another embodiment of the invention, the file system may callout to a downsampling/transcoding service that registers with the kernel-level service. Those skilled in the art will appreciate that any of the file system components (e.g., DMU, SPA, etc.) may perform size-reducing actions on identified files, and that embodiments of the invention are not limited to the use of a kernel-level service that accesses file system attributes and size-reducing libraries to perform size-reducing actions on identified files. Finally, the re-sized (i.e., downsampled and/or transcoded) files are stored back into the storage pool (ST 312).

The method described in FIG. 3 above may be used to reduce the size of any type of file that matches one or more criteria when the system reaches a size-reducing policy threshold. More specifically, in one or more embodiments of the invention, when the storage pool is reaching its capacity or when data integrity is compromised in some way, the file system can dynamically determine to reduce the size of specific files that match a particular user-defined or pre-set default criteria. Size reduction of the specific identified files is performed according to the one or more options for downsampling or transcoding that are stored as file system attributes or as extended attributes of each file. Accordingly, embodiments of the invention provide a method and system for the file system to perform downsampling and/or transcoding either on the fly or via batch mechanism as needed or, in one or more embodiments, preemptively (i.e., before the policy threshold is actually reached) based on monitored file system events.

The following examples discuss different size-reducing options for multimedia content in accordance with one or more embodiments of the invention. The following examples are not meant to limit the scope of the invention.

EXAMPLE 1

24-Bit RGB Bitmap (73,242 pixels)

Uncompressed→JPEG Full→JPEG Avg→JPEG Med→JPEG low
219K→83K→15K→10K→5K

In example 1, a JPEG graphical image data file includes attributes (either file system attributes or extended attributes) that indicate the option for full, average, medium, and low resolutions. Specifically, example 1 shows a 24-Bit RGB (red, green, blue) Bitmap, which represents 73,242 pixels. In uncompressed form, the size of the data representing the JPEG graphical image is 219K bytes. If the uncompressed graphical image is reduced in size to a JPEG full image, the size of the data representing the JPEG graphical image may be 83K bytes. A JPEG average file may be 10K bytes, and a JPEG low resolution file may be 5K bytes in size. Accordingly, based on the resolution size option encapsulated for this particular JPEG graphical image using attributes, the file system may downgrade the resolution of the file to one of the options indicated above to reduce the size of the file.

EXAMPLE 2

High Definition Video (Megapixels)

2160 p→1080 p→1080 i→720 p→576 i/p
8294K MP→2074K MP→1382K MP→1049K MP→414K MP

Example 2 shows options for high definition (HD) video content. The size of HD video is typically represented in megapixels (MP). For quad HD video resolution, the corresponding size of the stored data file would be 8,294K MP. Quad HD video can be reduced to a 1080 p full HD resolution, which would take up 2,074K MP of storage capacity. 1080 i is the interlaced resolution of 1080p, which takes up 1382K MP of storage capacity. The 720 p HD video resolution may be 1,049K MP in size, and the standard resolution for HD video is 576 i/p, which is 414K MP in size. One or more of the aforementioned HD video resolutions may be specified using file system attributes or extended attributes, such that the file system may perform size-reducing actions to reduce the size of HD video data stored in the storage pool to the size specified in the attributes.

EXAMPLE 3

Digital Audio (60 Minutes)

256 bit→224 bit →192 bit→160 bit→144 bit→128 bit . . . →32 bit
112 mb→98 mb→84 mb→70 mb→63 mb→56 mb . . . →14 mb Example 3 shows options for size reducing for digital audio files. A 256 bit resolution is 112 megabits (mb) in size, and options for reducing the bit resolution can go as low as 32 bit resolution, which is only 14 mb in size. One or more of the aforementioned digital audio resolutions may be specified using file system attributes or extended attributes, such that the file system may perform size-reducing actions to reduce the size of digital audio data stored in the storage pool to the size specified in the attributes.

EXAMPLE 4

Transcoding

RAW→JPEG
TIFF→JPEG
AAC→MPEG

In addition to changing the resolutions (e.g., downsampling) within the same file types (e.g., JPEG to lower resolution JPEG), attributes may also be used to specify transcoding options. Transcoding refers to changing the file type from an original file type to a new file type that may be smaller in size. Example 4 shows transcoding options that may be stored in file system attributes or extended attributes. A RAW image file representing unprocessed data from a sensor may be transcoded to a JPEG graphical image, a Tagged Image File Format (TIFF) file type may be converted to a JPEG graphical image, and a advanced audio coding (AAC) digital audio file may be converted to a MPEG file.

In one or more embodiments of the invention, the aforementioned process described in FIG. 3 may be used to downsample and/or transcode programs stored by a receiver/decoder in a digital broadcast environment. For example, consider the scenario in which a user has a digital video recorder (DVR) that records multimedia programs for later viewing. One of the programs recorded by the DVR may be a 1080 p resolution high-definition (HD) video multimedia file. Although a typical DVR can record many programs, the DVR has a limited capacity that may become full when too many programs are recorded. In this case, the DVR may delete recorded programs to create additional storage capacity for new recordings, starting with the oldest recorded program.

In one or more embodiments of the invention, the DVR programs may be managed by a file system. Attributes specifying various options for downsampling and/or transcoding one or more recorded programs may be stored as file system attributes or extended attributes. Using embodiments of the present invention, the file system may determine when the DVR reaches a particular threshold capacity, at which point one or more policies may be accessed to determine which programs to identify for downsampling/transcoding. For example, a particular policy may indicate that HD video files should be identified (because they are larger in size) for downsampling/transcoding. In this scenario, the HD video multimedia file stored in the DVR may be identified. Attributes of the HD video multimedia file may be accessed by the file system or by an external agent (in the case of extended attributes) to determine the options for downsampling the HD video multimedia file. Suppose the attributes indicate that the HD video multimedia file may be downsized to 720 p resolution. In this scenario, the file system or external agent may access downsampling libraries and obtain algorithmic functions for downsampling from 1080 p resolution to 720 p resolution. The HD video file may then be stored back into the DVR memory as a 720 p resolution file, creating additional space for the DVR.

In this example above, rather than deleting older recorded programs to create additional storage capacity in the DVR, the file system (or an external agent) may identify stored programs (e.g., the HD video file) that are suitable for downsampling and/or transcoding. Accordingly, the example described above enables a user to keep a recorded program at a lower resolution or in a different format rather than losing the information altogether.

Those skilled in the art will appreciate that while the aforementioned examples discuss data resolution and transcoding with respect to multimedia data, the present disclosure is not limited to multimedia data. Rather, embodiments disclosed herein may be used to adjust the density of any type of stored data. That is, file system managed attributes or extended attributes may be used to encapsulate data resolution and transcoding options for any suitable data type.

Those skilled in the art will also appreciate that the aforementioned examples are not meant to limit the scope of the present invention, and that many variations on the type of downsampling or transcoding performed to reduce the size of identified files may exist. For example, a downsampling option stored as a file attribute may provide for storing a remote copy of the data of a particular file. Thus, the file contents may be deleted or archived, and the file system may provide a pointer to remote copies of the eliminated local data. The remote copies of the data may be back-up copies stored on a remote computer system, network-attached storage (NAS), cloud storage, or any other suitable remote copy of the local file system data.

In one or more embodiments of the invention, the remote copies of the eliminated data may be implemented as snapshots. A snapshot corresponds to a state of the hierarchical block tree (HBT) of the storage pool at a given time, where the state of the HBT corresponds to all blocks referenced, directly or indirectly, by the root block of the HBT at the aforementioned time. In this scenario, the system architecture may be set up in a manner that provides for an option to re-populate the remote copies of data locally, for a monetary charge. In one or more embodiments of the invention, snapshots may also be used to allow recovery of previous versions of files. That is, previous version of files may be stored as snapshots and restored as storage capacity and policy permit. Snapshots are discussed in co-pending application Ser. No. 11/513,800, entitled Unlimited File System Snapshots and Clones, which is incorporated by reference herein in its entirety. A snapshot of the contents of a particular file may be taken at a particular point in time, and at one or more resolutions of the data. Accordingly, various images of the file contents may be stored in remote locations, which may capture the data at one or more different resolutions.

Alternatively, in one or more embodiments of the invention, the file system may pre-downsample or transcode data in anticipation of future file system requests. In this scenario, the size-reducing policy may specify to pre-downsample or transcode particular large files based on the number of data reads/writes monitored over a period of time. In this manner, system utilization may be more managed so that transcoding and downsampling are performed while the system is idle or less busy rather than during times when the system is very busy or overloaded with requests.

Figure 4:
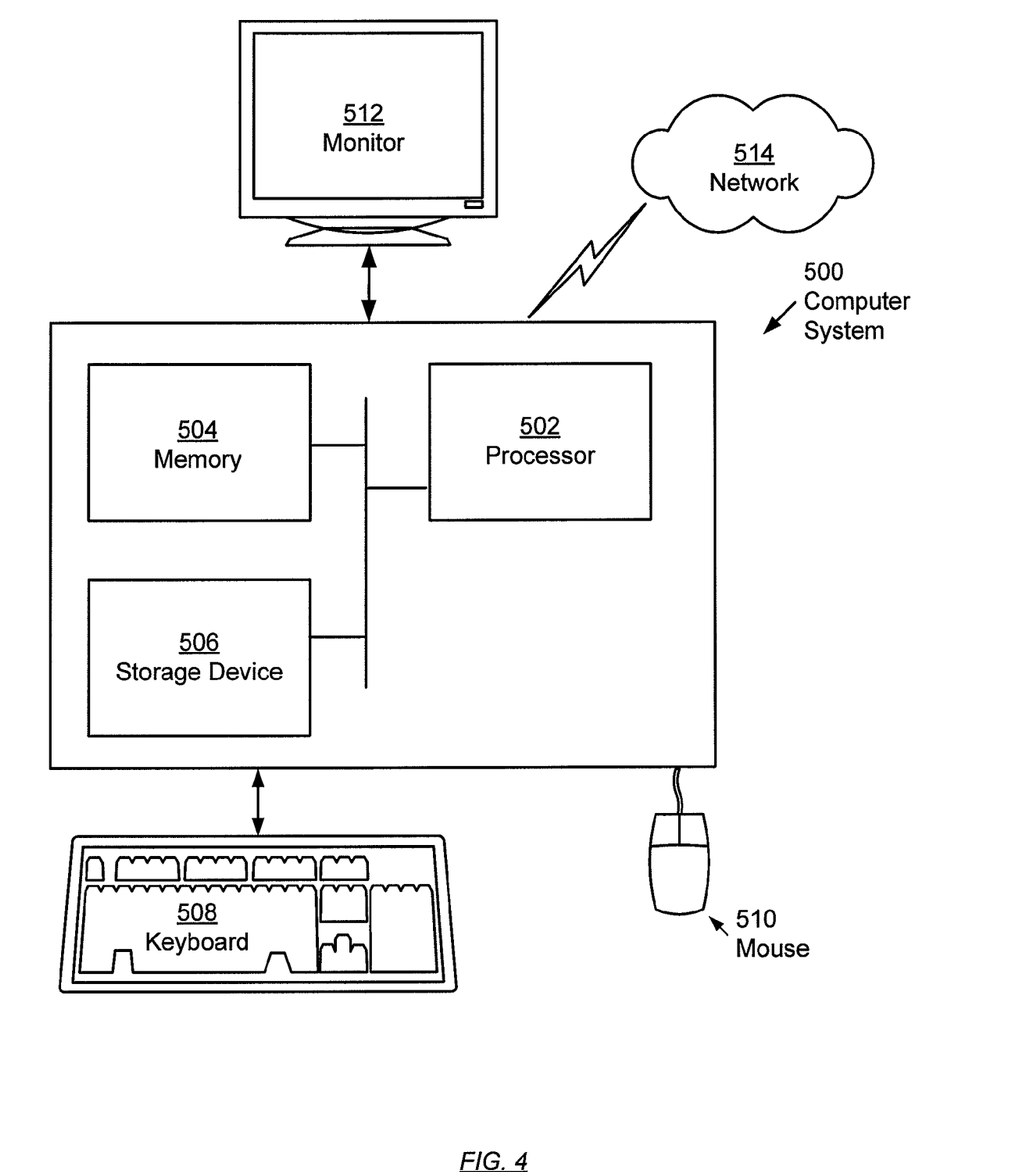
FIG. 4 shows a computer system in accordance with one or more embodiments of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., the DMU, SPA, POSIX layer, applications, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, a digital versatile disk (DVD), or any other suitable tangible computer readable storage device.

Embodiments of the invention provide a system architecture and method for on-demand adjustment of data density (e.g., resolution) to address capacity challenges. More specifically, embodiments of the invention extend traditional file system and logical volume manager functionality to include a mechanism for automatic data resolution and transcoding management of stored data. A file system can use data resolution and transcoding options stored as attributes to preserve stored data for extended periods of time without the impacts of deletion, compression, and archiving. Further, embodiments of the invention provide a mechanism for policy-driven determinations, which may be user or system defined, as to which stored data should be adjusted and how often stored data is adjusted.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions that, when executed, perform a method for preserving data stored in a file system comprising a plurality of files, comprising:
    determining whether storage capacity of the file system has reached a threshold level, wherein the threshold level is stored in at least one of a plurality of size-reducing policies;
    obtaining at least one criterion from the at least one size-reducing policy;
    identifying a first file and a second file of the plurality of files that match the at least one criterion;
    accessing metadata of each of the first file and the second file, wherein the metadata of the first file is stored as a file system attribute, and the metadata of the second file is stored as an extended attribute, and wherein the metadata of the first and second files comprises at least one option for reducing a size of the first file and a size of the second file, respectively;
    performing a first size-reducing action to reduce the size of the first file by calling a kernel-level service to perform the size-reducing action on the first file; and
    performing a second size-reducing action to reduce the size of the second file, wherein the second size-reducing action is performed by an external user-land service configured to access the extended file attribute on behalf of the file system.

2. The non-transitory computer readable medium of claim 1, further comprising:
    monitoring file system events; and
    performing the first and second size-reducing actions before the storage capacity has reached the threshold level based on the monitored file system events.

3. The non-transitory computer readable medium of claim 1, wherein the plurality of files comprise multimedia data.

4. The non-transitory computer readable medium of claim 1, wherein the at least one option for reducing the size of the first file and the second file comprises at least one of downsampling and transcoding.

5. The non-transitory computer readable medium of claim 4, wherein the file system comprises an interface that provides access to at least one size-reducing library comprising one selected from a group consisting of downsampling functions and transcoding functions.

6. The non-transitory computer readable medium of claim 4, wherein downsampling of the first and second files further comprises:
    eliminating at least one portion of data of the first and second files; and
    providing a pointer referencing a remote copy of the eliminated data.

7. The non-transitory computer readable medium of claim 6, wherein the remote copy of the eliminated data comprises a first snapshot of the data at a first resolution, and a second snapshot of the data at a second resolution.

8. The non-transitory computer readable medium of claim 1, wherein the at least one criterion comprises at least one selected from a group consisting of size of the data, age of the data, time of creation, type of file, and available file system storage capacity.

9. The non-transitory computer readable medium of claim 1, wherein the plurality of size-reducing policies and the at least one criterion are one of user-defined or system-defined based on an original file type.

10. A system, comprising:
   a file system comprising a plurality of files;
   a storage pool configured to store the plurality of files;
   a first service configured to:
      determine whether storage capacity of the file system has reached a threshold level, wherein the threshold level is stored in at least one of a plurality of size-reducing policies;
      obtain at least one criterion from the at least one size-reducing policy;
      identify a first file and a second file of the plurality of files that match the at least one criterion;
      access metadata of the first file, wherein the metadata of the first file is stored as a file system attribute and comprises at least one option for reducing a size of the first file; and
      perform a first size-reducing action to reduce the size of the first file by wherein the first service is a kernel-level service configured to perform the size-reducing action on the first file; and
   a second service configured to:
      access metadata of the second file, wherein the metadata of the second file is stored as an extended file attribute and comprises at least one option for reducing a size of the second file; and
      perform a second size-reducing action to reduce the size of the second file, wherein the second service is an external user-land service configured to access the extended file attribute on behalf of the file system and perform the second size-reducing action.

11. The system of claim 10, wherein the external user-land service has direct access to size-reducing libraries and the plurality of size-reducing policies.

12. The system of claim 10, wherein the at least one option for reducing the size of the first file and the second file comprises at least one of downsampling and transcoding.

13. The system of claim 12, wherein downsampling of the first and second files further comprises:
   eliminating at least one portion of data of the identified subset of files; and
   providing a pointer referencing a remote copy of the eliminated data.

* * * * *